United States Patent [19]

Nagano

[11] Patent Number: 4,522,610
[45] Date of Patent: Jun. 11, 1985

[54] GEAR CRANK APPARATUS FOR A BICYCLE
[75] Inventor: Masashi Nagano, Izumi, Japan
[73] Assignee: Shimano Industrial Company Limited, Osaka, Japan
[21] Appl. No.: 497,051
[22] Filed: May 23, 1983
[30] Foreign Application Priority Data Jun. 1, 1982 [JP] Japan .................................. 57-94396
Jul. 2, 1982 [JP] Japan .................................. 57-115837
Oct. 9, 1982 [JP] Japan .................................. 57-177828

[51] Int. Cl.³ ............................................. F16H 55/30
[52] U.S. Cl. .................................................... 474/141
[58] Field of Search .................. 474/141, 78; 280/236, 280/261

[56] References Cited

U.S. PATENT DOCUMENTS

| 513,589 | 1/1894 | Metz | 474/141 |
| 528,145 | 10/1894 | Carr | 474/141 X |
| 591,488 | 10/1897 | McMullin | 474/141 X |
| 2,693,119 | 11/1954 | Payberg et al. | 474/141 X |
| 2,827,797 | 3/1958 | Bell et al. | 474/141 X |
| 3,259,398 | 7/1966 | Hattan | 474/141 X |
| 4,181,034 | 1/1980 | Daniel | 474/141 |

FOREIGN PATENT DOCUMENTS

| 389663 | 8/1932 | Belgium . |
| 814111 | 9/1951 | Fed. Rep. of Germany . |
| 7821953 | 11/1978 | Fed. Rep. of Germany . |
| 460239 | 11/1913 | France . |
| 821216 | 4/1937 | France . |
| 880851 | 4/1943 | France . |
| 974415 | 2/1951 | France ................................ 474/141 |
| 1039783 | 10/1953 | France . |
| 1112643 | 3/1956 | France . |
| 1411026 | 4/1964 | France . |
| 2264709 | 10/1975 | France . |
| 2440863 | 11/1978 | France . |
| 282923 | 5/1952 | Switzerland . |
| 449504 | 6/1936 | United Kingdom ................ 474/141 |

Primary Examiner—Stephen J. Novosad
Assistant Examiner—Thuy M. Bui
Attorney, Agent, or Firm—Stevens, Davis, Miller & Mosher

[57] ABSTRACT

A gear crank apparatus for a bicycle, comprising a crank shaft, a pair of crank arms, and at least one chain gear. The chain gear has an ellipse-like shape and peripheral teeth located on different pitch diameters, the chain gear being arranged with respect to the crank arms and being coupled therewith, so that when torque produced by a cyclist's leg during pedalling is maximum, the gear diameter for transmitting the torque from the chain gear to a driving chain becomes substantially minimum and when the torque is a minimum, the gear diameter becomes substantially a maximum.

7 Claims, 9 Drawing Figures

GEAR CRANK APPARATUS FOR A BICYCLE

FIELD OF THE INVENTION

This invention relates to a gear crank apparatus for a bicycle, and more particularly to a gear crank apparatus comprising a crank shaft, a pair of crank arms and at least one chain gear.

In detail, the gear crank apparatus of the invention, in combination with a rear chain gear mounted to a rear wheel hub at the bicycle, and a driving chain stretched across the chain gear and the rear chain gear, constitute a drive mechanism.

BACKGROUND OF THE INVENTION

Generally, this kind of gear crank apparatus is mounted on a bottom bracket at the bicycle and the driving chain is stretched across the chain gear of the apparatus and the rear chain gear at the rear wheel hub, thereby constituting a drive mechanism. Pedals provided at the crank arms are pedalled to transmit a torque caused by motion of a cyclist's legs to the rear chain gear through the driving chain to thereby drive the rear wheel for the bicycle's running.

The cyclist rides on a saddle at the bicycle and treads the pedals around the crank shaft, in which the motion of his legs is similar to the movement of pendulum while walking, in other words, the motion of pedal has an inherent cycle period and a speed pattern on the basis of length of the fulcrum and the centroid.

The torque output by the cyclist's leg when pedalling, as shown in the pedalling cycle period in FIG. 3, varies in the positions where the crank arms are in proximity to the upper and lower dead points thereof and in a region therebetween, thereby being minimum near both the dead points and maximum after rotation at an angle of about 70°±5° ahead of the upper dead point in the driven-rotation direction of each crank arm.

This variation of torque depends on the motion of a cyclist's leg during pedalling and the position of each pedal relative to its motion, which tends to be indifferent regardless of the size and type of bicycle and different muscular strength of the cyclist.

Since an elliptic chain gear has a changeable pitch diameter of each tooth so that a gear ratio of the same to the chain gear of a fixed pitch diameter is changeable, it is deemed that in a case of using the elliptic chain gear as the front chain gear for the bicycle, the maximum gear ratio is set in the region between the upper and lower dead points for obtaining the maximum torque for pedalling, while, the minimum gear ratio at the upper and lower dead points for the minimum torque only.

However, the circumferential speed of the pedal reduces in the region for the maximum gear ratio to thereby lower the power and increases at the upper and lower dead points for the minimum gear ratio to thereby rather apply a physical load on the cyclist.

In other words, in consideration of the motion of the leg, the muscular strength is output to a maximum with less energy consumption in the region between the upper and lower dead points of the crank arms, whereby the increased circumferential speed can improve the power from the relation: Power=Torque×Speed. Nevertheless, the aforesaid construction reduces the speed in this region to conversely lower the power. On the other hand, at the upper and lower dead points and in proximity thereto, the energy consumption for pedalling is required more than in the above region, but the muscular strength cannot inherently be output, whereby the reduced circumferential speed at both the dead points can reduce the physical load on the muscles of cyclist. Nevertheless, the circumferential speed increases to apply a more physical load onto him.

SUMMARY OF THE INVENTION

An object of the invention is to provide a chain gear which has at least one not-round chain gear shaped like an ellipse which is capable of achieving great power, reducing a physical load on the cyclist, and enabling a smooth pedalling by use of the characteristic of this chain gear.

The inventor has found that the motion of the cyslist's legs has a predetermined cycle period and speed pattern, whereby pedalling motion not matched with the pattern will increase the muscular strength and give the cyclist an excessive physical load.

In other words, this invention has been designed after paying attention to the fact that power during the pedalling can be improved by increasing the circumferential speed of pedals for the maximum torque by the cyclist's legs, while, a load on the muscles can be reduced at slow circumferential speed for the minimum torque. The foundamental concept of the invention is that a not-round and ellipse-like-shaped chain gear is assembled with the crank arms so that the gear diameter of chain gear becomes minimum or about minimum in the region between the upper and lower dead points where the maximum torque is obtained for pedalling and becomes maximum or about maximum at the upper and lower dead points only for minimum torque. Namely, in the region for maximum torque between the upper and lower dead points of crank arms, a smaller gear diameter portion is used to increase the circumferential speed of the pedals and match the pedalling with the speed pattern of the motion of leg, and at the upper and lower dead points only for the minimum torque, a larger diameter portion is used to reduce the circumferential speed to thereby match the motion of the cyclist's legs with the speed pattern, resulting in that the power per cycle period of pedalling is improved, an output of muscular strength (energy consumption) is reduced with respect to an amount of work, and the physical load on the cyclist is reduced to permit a smooth pedalling.

In addition, leg torque referred to in the above and following description means a torque of the articulation output from the motion thereof caused by contraction and expansion of the muscles of the cyclist's legs.

Next, explanation will be given on the basic construction of the invention.

The chain gear is made not-round like an ellipse and different circumferentially of the gear body in pitch diameter of a number of teeth at the outer periphery of the same so that the leg torque is transmitted through the different gear diameter to a driving chain driven by rotation of the crank arms. Also, there is, between the chain gear and the crank arms, the relation that the maximum leg torque during the rotation of crank arms is transmitted to the driving chain through the chain gear whose diameter is about minimum and the minimum leg torque is transmitted through the chain gear whose gear diameter is about maximum, thus allowing the chain gear to correspond to the crank arms.

Accordingly, the angular velocity is increased in the region for larger torque and reduced in the same only for smaller torque to thereby improve the power, reduce the maximum torque and match the pedalling with the speed pattern of the motion of the cyclist's legs.

In other words, since the circumferential speed of each pedal is increased in the region where the larger torque is obtainable, the increased power and the pedalling matched with the motion of legs can reduce the energy consumption for pedalling more than that at the reduced circumferential speed. Furthermore, in the region where a large torque is not obtainable, the circumferential speed of each pedal is reduced, but the pedalling is matched with the leg motion although the power is somewhat reduced, whereby the energy consumption is less than that in the increased circumferential speed. As a result, the cyclist is subjected to less physical load and can drive the bicycle with light and smooth pedalling.

The power is reduced in the region of lower torque, but increased in the same for larger torque, whereby the load for the same work, as a whole, is reducible in comparison with the use of round or elliptic chain gear for reducing the circumferential speed in the region for the larger torque and for increasing it in the region of lower torque.

Alternatively, this invention may be applicable to a multistage gear crank apparatus of a plurality of different diameter chain gears. In this case, the gear larger in diameter and in tooth-number may be round as conventional, but the gear smaller in diameter and in tooth-number is made not-round like an ellipse, which are assembled as described hereinafter. Thus, a gear crank apparatus is provided which can most suitably use each chain gear corresponding to different conditions for use.

In other words, in the multistage gear crank apparatus, the smaller diameter gear generally is used for driving the bicycle, for example, on an upward slope or a rough road, wherein slow speed and larger torque are required, and conversely the larger diameter gear for driving the bicycle on a flat road or a downward slope requires quick speed and larger power. The cyclist often drives the small diameter gear in an about erect posture and the larger diameter gear in an forwardly leaning posture, so that the maximum diameter portion of the smaller diameter gear is shifted forwardly in the forward rotation direction of crank arms with respect to the minimum diameter portion of the larger diameter gear, to thereby use each gear suitably corresponding to different conditions for use.

In further detail, when the cyclist in the erect posture rotates the smaller diameter chain gear by pedalling beyond the upper dead point of the crank arm, an angle between the upper half of his body and his leg is larger than that in the forwardly leaning posture, whereby outputting the leg torque which becomes early maximum during the pedalling by the cyclist in the erect posture. Hence, the leg torque while pedalling in the forwardly leaning posture becomes maximum later, so that each chain gear shifts in phase for the maximum torque, in the forward rotation direction of the gear. The inventor has paid attention to the above, so that the maximum gear diameter portion at the smaller diameter gear is shifted in the forward rotation direction of the crank arms at an angle mainly of 5° to 15°, preferably 10°, corresponding to the phase shift with respect to the maximum gear diameter portion at the larger diameter gear.

In addition, a ratio of length between the maximum and minimum gear diameter portions at each gear is made 1.06 to 1.20, but it is preferable to change the ratio to 1.06 in the larger diameter gear and 1.09 in the smaller diameter one.

The reason for the above is that the number of normal rotations of each gear is different as 60 to 80 rpm at the smaller diameter gear and 70 to 90 rpm at the larger diameter one, and for the same power, the maximum torque increases at low speed in a smaller number of rotations, decreases at high speed in a larger number of rotations, and is zero near the upper and lower dead points of crank arms. Hence, the torque ratio of the maximum to the minimum is larger at the smaller diameter gear than the larger diameter one, whereby it is better for efficiently obtaining the muscular strength for the motion of the articulation and reducing the physical load on the cyclist to change the ratio of length corresponding to the torque output by use of each gear.

These and other objects of the invention will become more apparent in the detailed description and examples which follow.

DETAILED DESCRIPTION OF THE INVENTION

Figure 1:
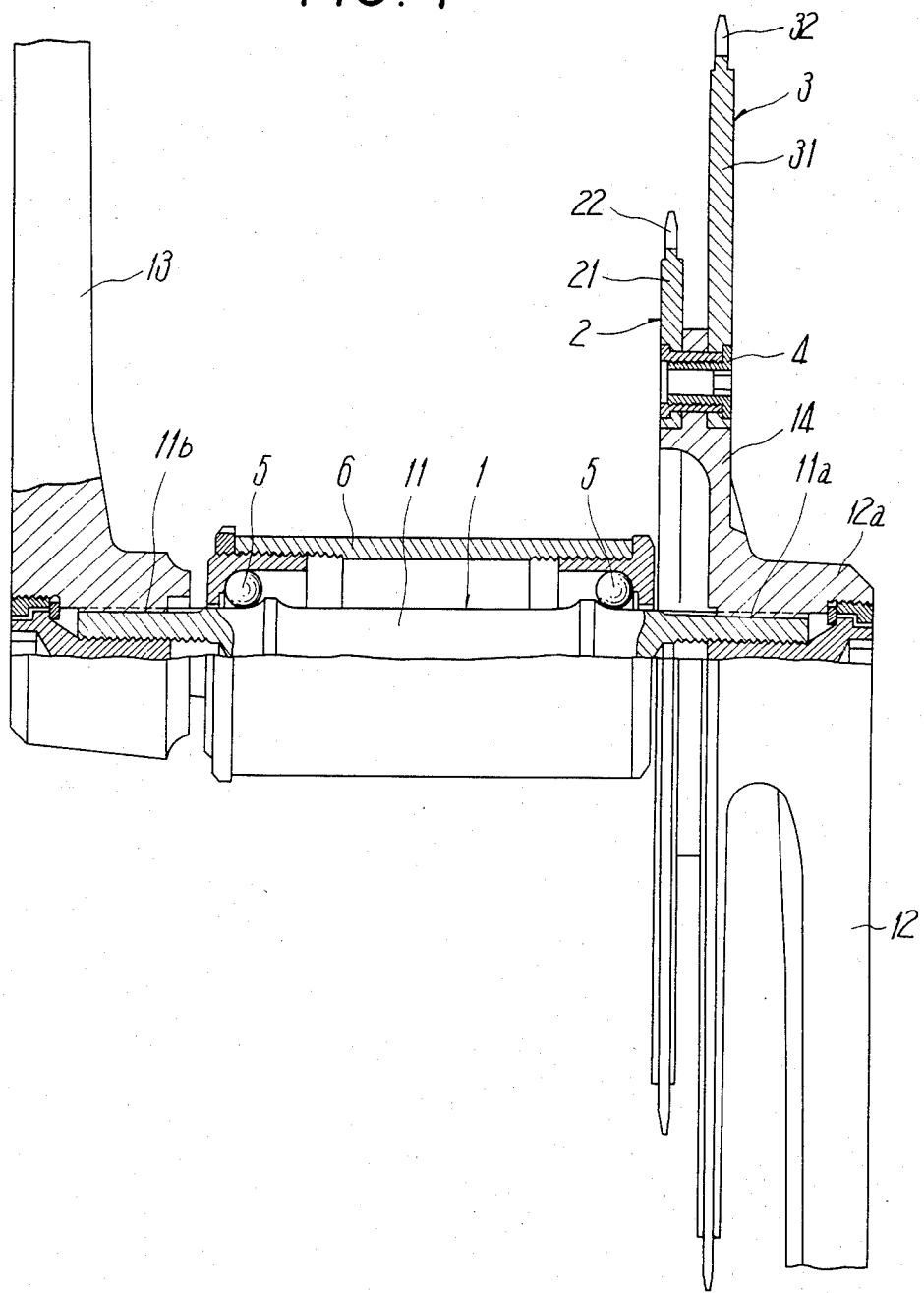
FIG. 1 is a partially cutaway front view of an embodiment of a gear crank apparatus of the invention.

A gear crank apparatus shown in the drawing includes a crank 1 comprising a crank shaft 11 having at both axial ends fitting portions 11a and 11b and a pair of crank arms 12 and 13 fitted thereon, and a first chain gear 2 smaller in tooth-number and a second chain gear 3 larger in tooth-number, which are mounted onto a boss 12a at one crank arm 12 through a radially extending stay 14, the chain gear 2 or 3 selectively carrying a driving chain. The chain gears 2 and 3 have the bodies 21 and 31 and a number of teeth 22 and 32 mounted circumferentially at the outer peripheries of the bodies 21 and 31 respectively and are coupled with each other through a plurality of connectors 4.

Figure 2:
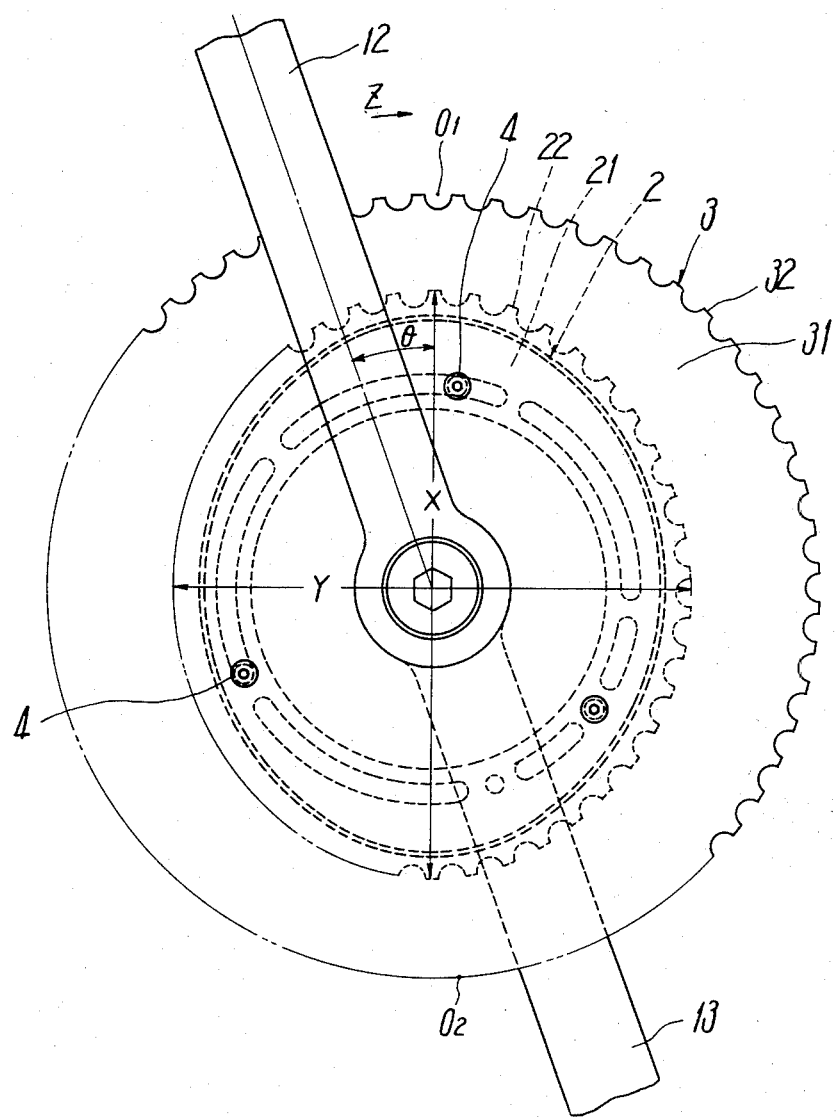
FIG. 2 is a side view of the FIG. 1 embodiment on a reduced scale.

Referring to FIGS. 1 and 2, the second chain gear 3 larger in tooth-number is made round as conventional and the first chain gear 2 smaller in tooth-number is made not-round like an ellipse and has a number of teeth different in pitch number circumferentially of body 21, so that the crank 1 is operated to rotate the first chain gear 2 to thereby vary the diameter of the gear for transmitting the torque by the cyclist's leg to the driving chain.

Namely, the first chain gear 2, as shown in FIG. 2, is formed as an ellipse having a major axis and a minor axis intersecting perpendicularly to each other, the first chain gear 2 and second chain gear 3 being assembled with the crank arms 12 and 13 as follows:

The fundamental technical idea of the invention for the assembly is that during the rotation of crank arms 12 and 13, the gear diameter of first chain gear 2 is about minimum when the leg torque is maximum, and about maximum when the same is minimum.

In other words, the crank arms 12 and 13, as shown in FIG. 2, shift rearwardly from the major axis X in the rotation direction of crank arms 12 and 13 (in the direction of the arrow Z in FIG. 2), so that when the crank arms 12 and 13 rotate beyond the upper and lower dead points thereof to enter in the region where the maximum torque is obtainable, the gear diameter of chain gear 2 is made minimum to thereby reduce the gear ratio between the front chain gear and the rear chain gear, thus increasing the angular velocity of each pedal, and when the crank arms are positioned in the vicinity of the upper and lower dead points $O_1$ and $O_1$ where the small torque only is obtainable, the gear diameter of first chain gear 2 is made maximum to enlarge the above gear ratio and reduce the angular velocity of the pedal.

Figure 3:
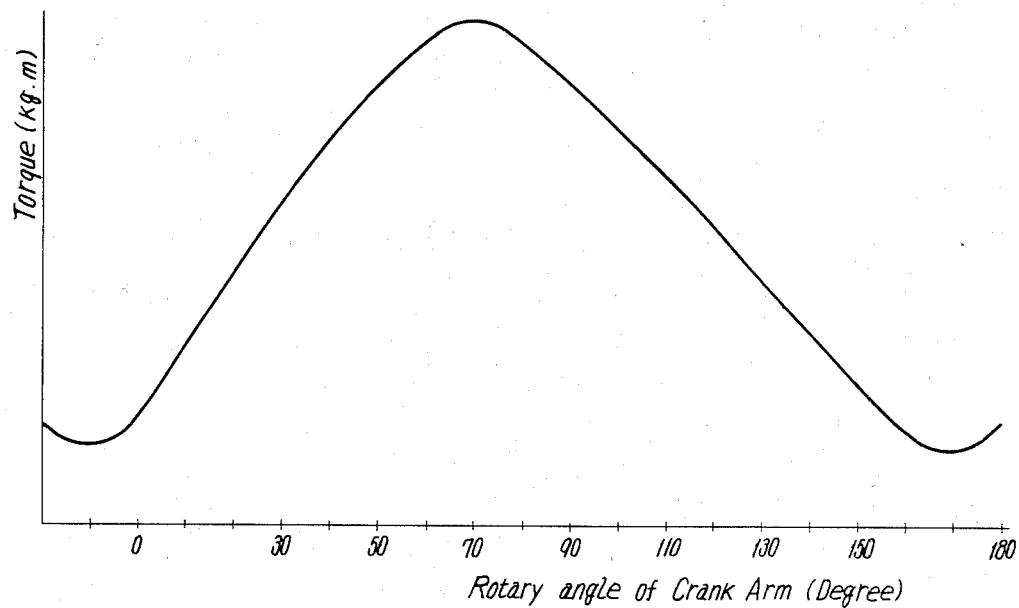
FIG. 3 is a view explanatory of the relation between a rotary angle of a crank arm and a torque of a cyclist's leg.
Figure 4:
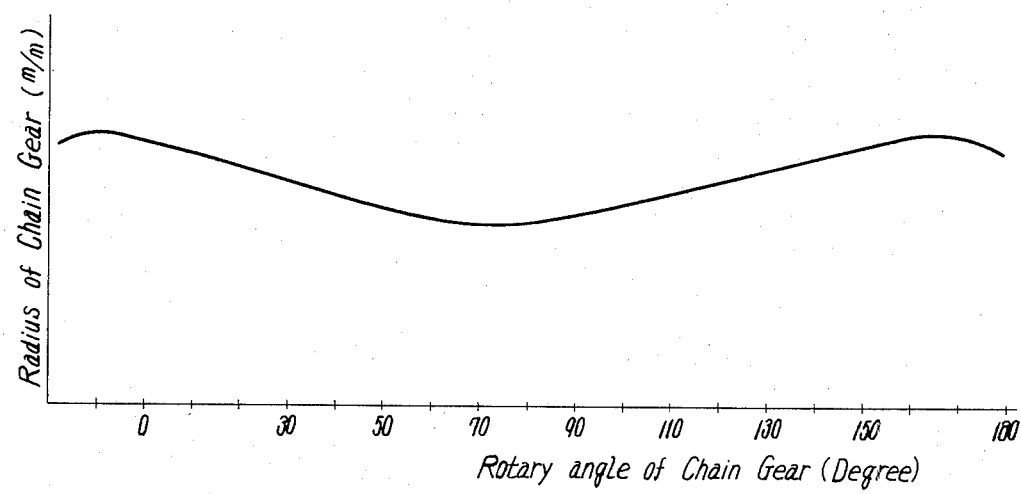
FIG. 4 is a view explanatory of the relation between a rotary angle of a chain gear and a radius thereof.

In detail, the leg torque changes during one rotation of each crank arm 12 or 13 as shown in FIG. 3.

At the major axis X portion of first chain gear 2, a gear ratio thereof to the rear chain gear G becomes larger and the angular velocity of each pedal is reduced, the gear ratio being smaller to increase the angular velocity.

On the basis of the above, at the position where the arm 12 or 13 rotates forwardly in the driven-rotation direction thereof at an angle of 30° to 120° beyond the upper dead point and the maximum torque is obtained, the gear diameter, in turn the pitch diameter of the tooth in engagement with the chain, is made smaller to reduce the gear ratio of first chain gear 2 to the rear chain gear G, thereby increasing the angular velocity of the pedal, improving the power in the region wherein the large torque originally is obtainable, and matching the pedalling with the speed pattern derived from the motion of leg. When the crank arms 12 and 13 are positioned in the region wherein only the smaller torque is obtainable, that is, in the vicinity of the upper and lower dead points of crank arms 12 and 13, the gear diameter of first chain gear 2, in turn the pitch diameter of the tooth engaging with the chain, becomes larger to make larger the gear ratio of first chain gear 2 to the rear chain gear G, thereby increasing the gear ratio therebetween and reducing the angular velocity, so that in the region wherein the small torque only is obtainable, although no output is obtained, the speed increases to reduce the load on the muscles of the cyclist's legs and match the pedalling with the speed pattern of the leg motion, thus reducing a physical load on the cyclist.

Thus, the gear diameter becomes minimum and the angular velocity of each pedal is increased in the region wherein the larger torque is obtained, between the upper and lower dead points of crank arms 12 and 13, thereby raising the power to a maximum.

This means that the torque is smaller enough for a unit work because of the relation of Power=Torque×Angular Velocity. Also, since the leg motion is quickened in the above region between the upper and lower dead points, the pedalling matches with the speed pattern of the leg motion similar to movement of a pendulum.

Since the gear diameter becomes a maximum and the angular velocity of pedal is reduced in the region where the larger torque is not obtained, that is, in the vicinity of the upper and lower dead points of crank arms 12 and 13, the power is insufficient, but has less influence on the whole amount of work because the larger torque is not output originally in this region, whereby the insufficient power rather gives no physical load on the cyclist, and also the leg motion is made slow in this region, thereby matching the pedalling with the speed pattern of leg motion.

Accordingly, the power can be improved in the region where the larger torque is obtained, so that a larger amount of power is obtainable as a whole and pedalling is matched with the speed pattern to thereby reduce energy consumption during pedalling, thus reducing the physical load on the cyclist and enabling a smooth pedalling.

Now, in the case where the ratio of the major axis to the minor axis of chain gear 2 is 1.1:1 and the round chain gear is used, assuming that the maximum torque is 30 kg-m and the minimum one 5 kg-m, the ratio of angular velocity of the pedal with respect to the round chain gear is 0.95 at the major axis side and 1.05 at the minor axis side. In the chain gear 2, the major axis side corresponds to the region wherein only the minimum torque is output, and the minor axis side to the region where the maximum torque is obtained, whereby the maximum torque when using the chain gear 2 is 28.5 kg-m and the minimum torque 5.25 kg-m from the relation of Power=Torque×Speed.

Hence, the torque increases by 0.25 kg-m at the major axis side, but decreases by 1.5 kg-m at the minor axis side, in which the rate of decrement is larger. Thus, the maximum torque can be reduced by 5 to 8% in a measured value, whereby an integrated value of torque per one cycle period of pedalling, even when the minimum torque increases, is reducible by 2 to 3%. Moreover, the motion of the leg can be matched at its inherent cycle period with the speed pattern, thereby also reducing the energy consumption for pedalling and simultaneously reducing the integrated value measured by an electromyogram by 2 to 3%.

The first chain gear 2 which is elliptic and smaller in tooth-number is assembled with the crank arms to generate the maximum torque at the minimum gear diameter and vice versa, and used for driving the bicycle by the larger torque and at slow speed on, for example, an upward slope or a rough road, in which the cyclist's leg just beyond the upper dead point of crank arm usually moves accelerating its mass so that some torque is not applied to the pedal although the muscle in fact outputs the energy. While, the leg just before the lower dead point of crank arm moves to decelerate its mass, whereby some torque acts on the pedal although the muscle actually is inactive. Accordingly, it is preferable that the minimum gear diameter portion and the maximum gear diameter portion at the chain gear 2 shift at angles of about 15°±5° forwardly in the driven-rotation direction of crank arm 12 with respect to the positions for the maximum and minimum leg torques respectively.

In addition, in the aforesaid construction, the ratio of the major axis X to the minor axis Y at the first chain gear 2 is made 1.07 to 1.20, the major X being made smaller than an outer diameter of second chain gear 3.

Figure 6:
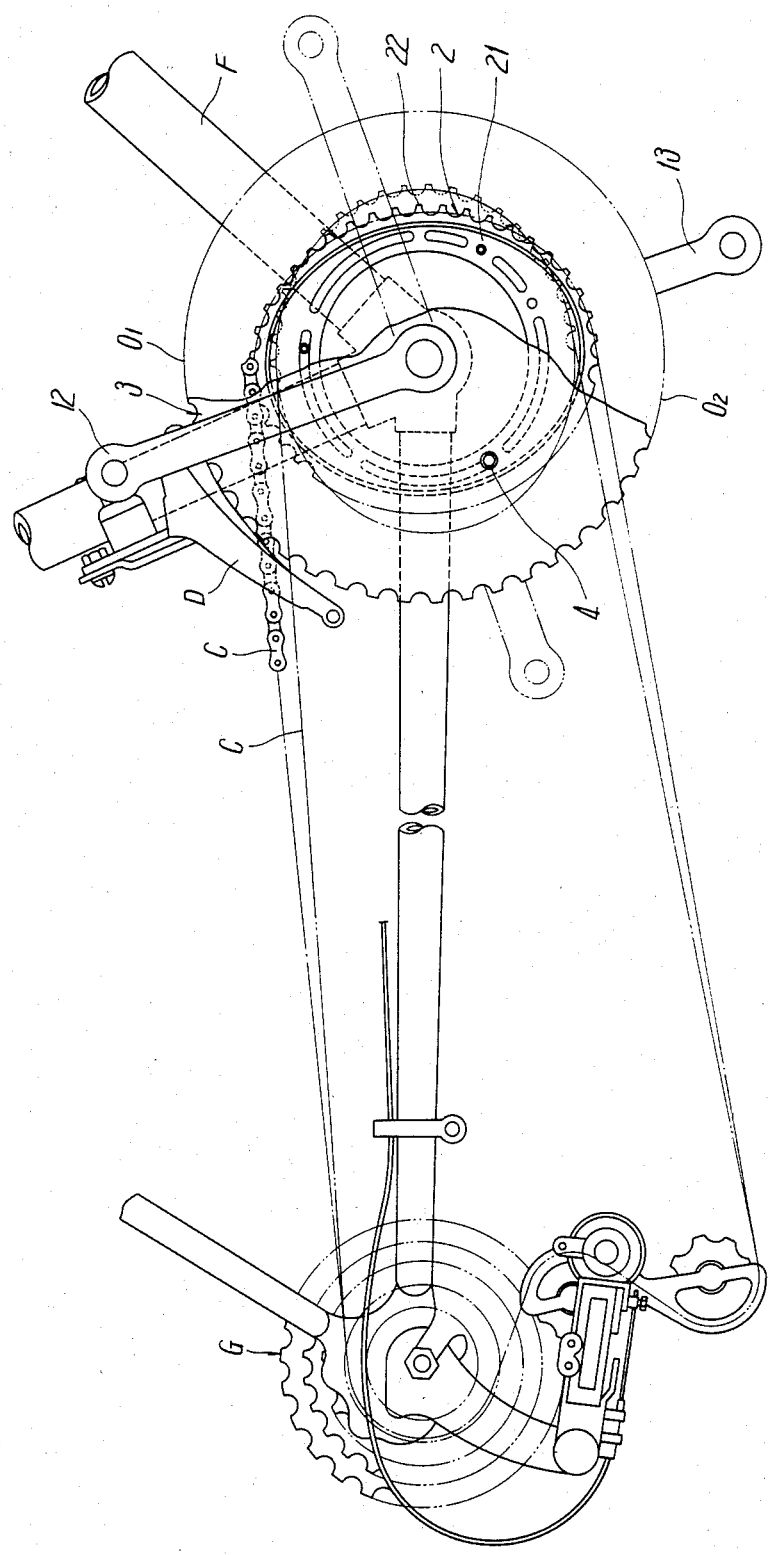
FIG. 6 is a view explanatory of the gear crank apparatus when in use.

Now, the gear crank apparatus constructed as described above and shown in FIG. 6, is assembled with the rear chain gear G mounted to the rear wheel hub at the bicycle and with the driving chain C stretched across the rear chain gear G and the first or second chain gear 2 or 3 to thereby form a drive apparatus, in which the crank shaft 1, as shown in FIG. 1, is supported rotatably to a bracket lug 6 at the bicycle frame F through balls 5.

Accordingly, the torque produced by the cyclist's legs rotates the chain gear 2 or 3 which drives the rear chain gear G through the driving chain C switched selectively to the chain gear 2 or 3 by use of a front derailleur D provided near the front chain gear at the chain entering side.

Figure 5:
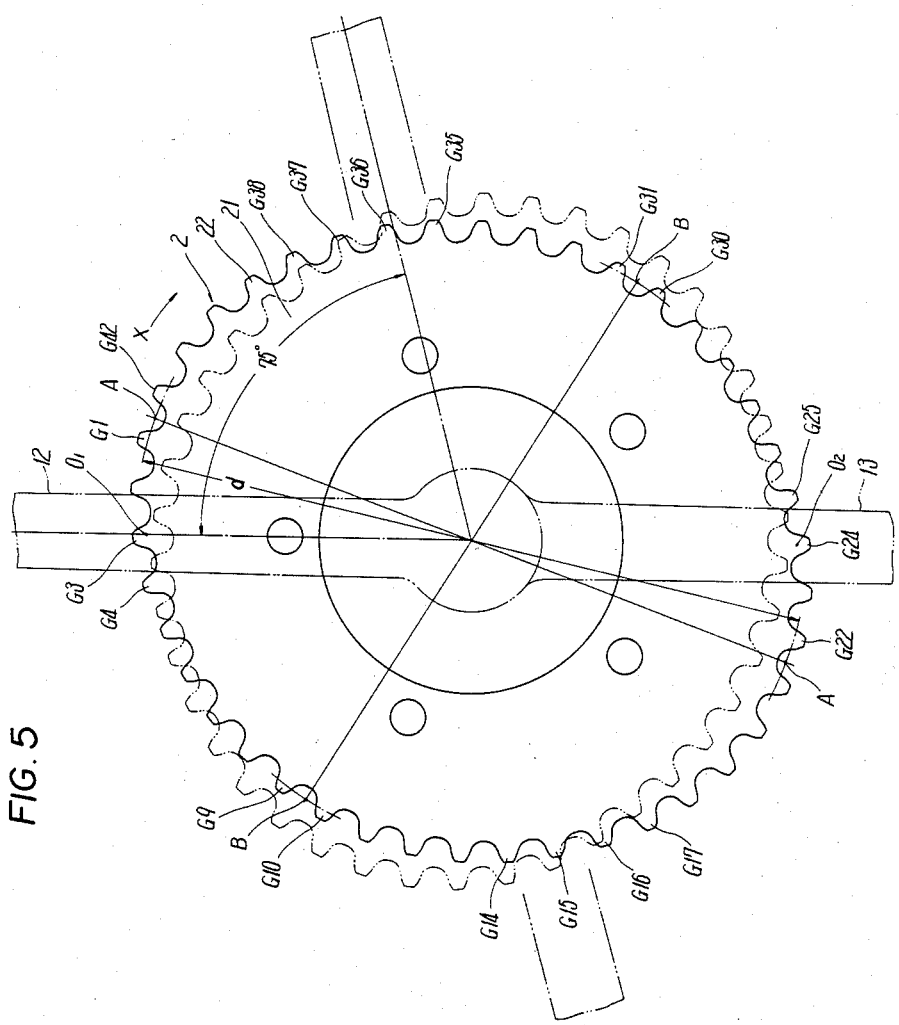
FIG. 5 is a schematic view explanatory of a modified embodiment of the invention, showing chain gears thereof.

Alternatively, the first chain gear 2 may be formed in an ellipse whose major and minor axes do not intersect perpendicularly to each other, for example, a point-symmetrical ellipse as shown in FIG. 5. In brief, the first chain gear 2 need only be not-round like an ellipse.

Referring to FIG. 5, the first chain gear 2 has forty-two teeth and the pitch diameters d thereof are different corresponding to the rate of change of the leg torque. In detail, assuming that a 1st tooth $G_1$ through a 42nd one G42 are positioned behind the basic position A of maximum pitch diameter in the driven-rotation direction (in the direction of the arrow X) of the first chain gear 2 in FIG. 5, 9th and 10th teeth G9 and G10 and 30th and 31st teeth G30 and G31 positioned rearwardly in the driven-rotation direction of gear 2 with respect to the 1st tooth $G_1$ and a 22nd tooth G22 different therefrom in phase at an angle of 180°, are made minimum in pitch diameter respectively to thereby form the minimum pitch diameter positions B. Also, 3rd and 4th teeth G3 and G4 and 24th and 25th teeth G24 and G25, positioned rearwardly of the 1st and 22nd teeth G1 and G22 in the driven-rotation direction of gear 2, are made maximum in the rate of change of pitch diameter respectively. The rates of change of pitch diameters D of 14th through 17th teeth G14 through G17 and 35th through 38th teeth G35 through G38 are made larger than those of pitch diameter of other teeth.

The above construction sets the pitch diameter D corresponding to the rate of change of torque of the leg by observing that the rate of change for the leg torque when the torque changes from the minimum to maximum, becomes larger than that when the torque changes vice versa. Thus, the cyclist's legs move smoothly during pedalling.

In addition, the crank arms shown by the phantom line in FIG. 5 are positioned ahead by 75° of those shown by the solid line.

Figure 7:
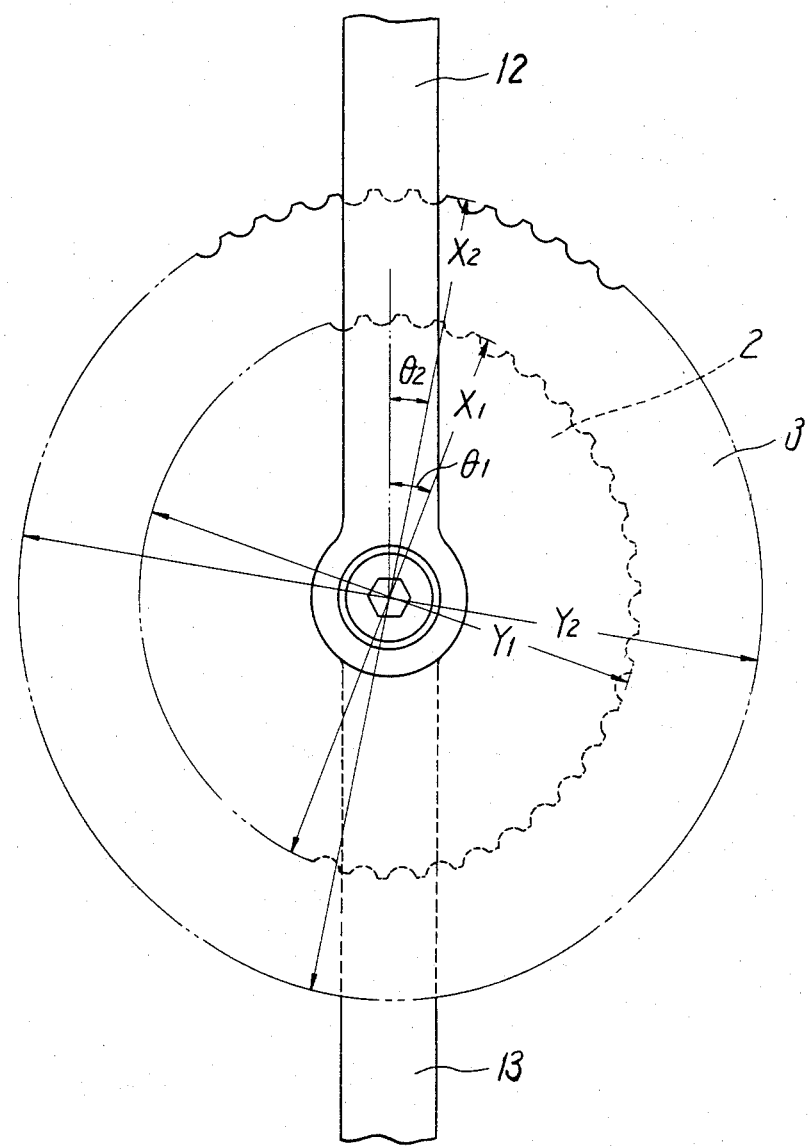
FIG. 7 is a partially omitted side view of another modified embodiment of the invention.

Alternatively, the second chain gear 3, as shown in FIG. 7, may be elliptic also, or a single chain gear may be used for this aparatus.

Next, explanation will be given on a modified embodiment of the invention shown in FIG. 7.

A first chain gear 2 elliptic and smaller in tooth-number has the major axis $X_1$ and the minor axis $Y_1$ and a second chain gear 3 larger in tooth-number has major and minor axes $X_2$ and $Y_2$.

The elliptic chain gears 2 and 3, like in the aforesaid embodiment, are assembled to the crank 1 in such a manner that when the crank arm 12 or 13 during the pedalling is positioned beyond the upper dead point thereof and in the range from 30° to 120° wherein the maximum torque is obtainable, the gear diameters of chain gears 2 and 3 become about minimum and the angular velocity of the pedal increases within said range, and when the crank arm 12 or 13 is positioned in the vicinity of the upper dead point and in region wherein the small torque only is obtainable, the gear diameters of the same become about maximum to reduce the angular velocity in this region. Moreover, in this case, the maximum gear diameter portion, i.e., the major axis $X_1$, of gear 2 shifts ahead of that $X_2$ of gear 3 in the forward rotation direction of crank 1.

Figure 8:
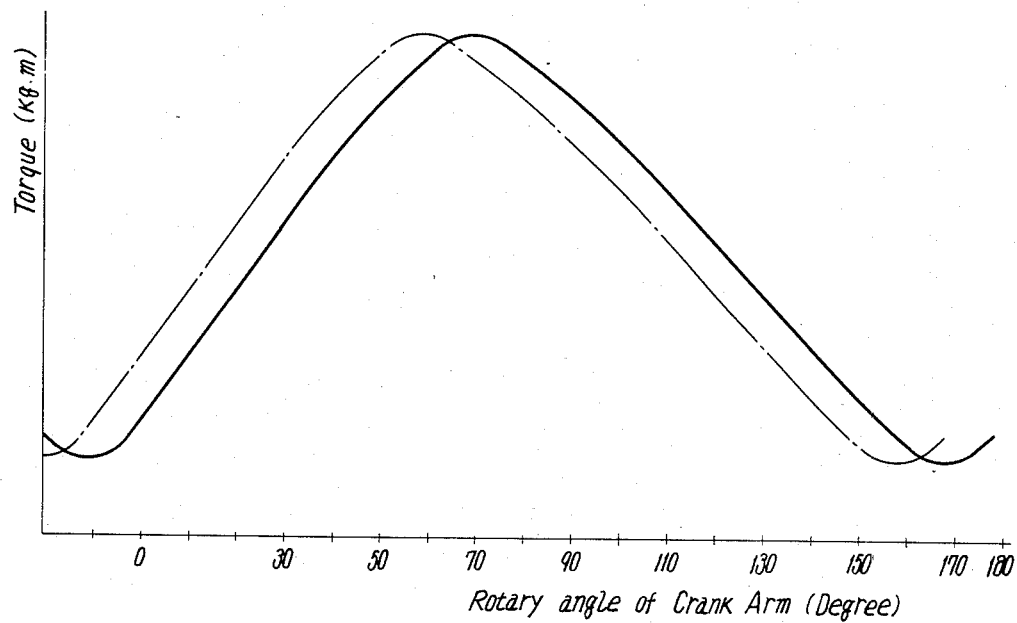
FIG. 8 is a view explanatory of the relation between a rotary angle of the crank arm and a torque of the cyclist's leg.

In further detail, produced by a cyclist's leg during pedalling changes as shown by the solid and chain lines in FIG. 8.

Namely, the first chain gear 2 is used for driving the bicycle on an upward slope which requires a slow speed and large torque and the cyclist often drives it in his substantially erect posture.

Therefore, the torque curve in use of first gear 2, as shown by the solid line in FIG. 8, shifts in phase of maximum torque forwardly in the driven-rotation direction of crank 1 with respect to that in use of second gear 3, the shifting angle being changeable corresponding to the number of teeth at the first and second gears 2 and 3 and being an angle of 10° in the FIG. 7 embodiment.

In other words, in FIG. 7, the major axis $X_2$ of second chain gear 3 is shifted at an angle $\theta_2$ of 5° forwardly of crank arms 12 and 13 in the driven-rotation direction thereof and the major axis $X_1$ of first chain gear 2 is shifted at an angle $\theta_2$ of 15° ahead of the crank arms 12 and 13, thus setting the aforesaid shifting angle to be 10°.

Figure 9:
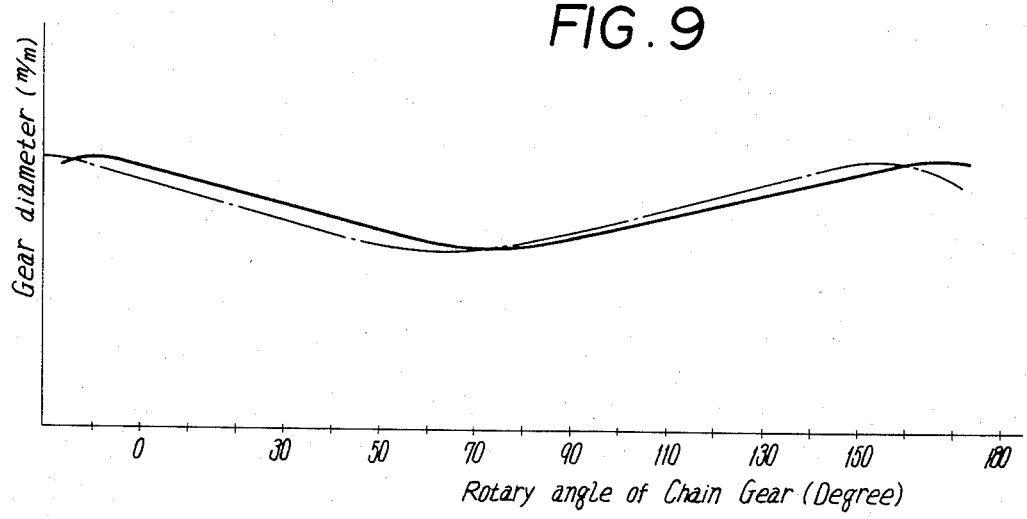
FIG. 9 is a view explanatory of the relation between a rotary angle of the chain gear and a radius thereof.
Figure 1:
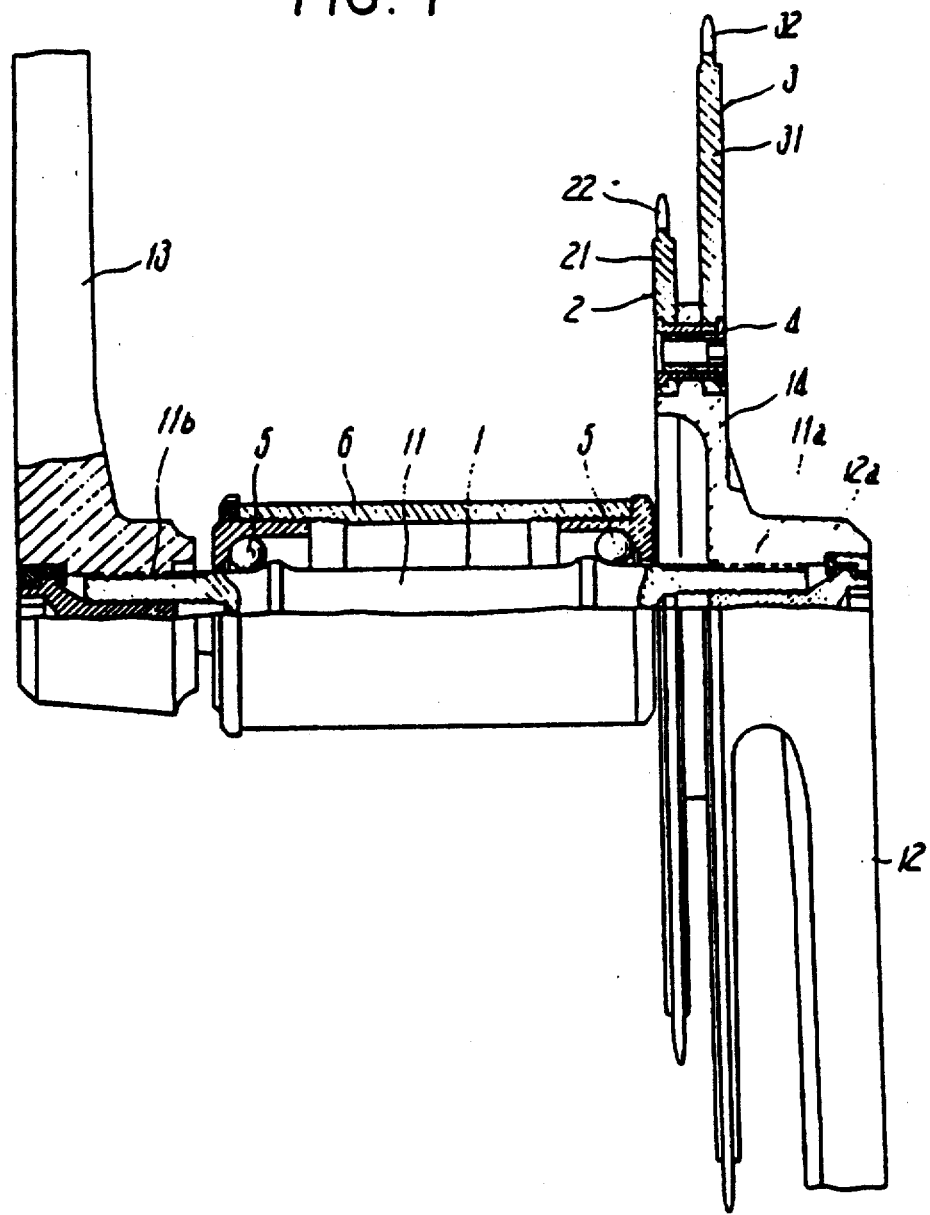

As seen from FIGS. 8 and 9, in a case of using either chain gear 2 or 3, the gear diameter is made about minimum and the angular velocity of each pedal can be increased in the region wherein the maximum torque is obtained, thereby matching the pedalling with the speed pattern of the motion of a cyclist's leg to increase power. While, the gear diameter is made about maximum and the angular velocity is reduced in the region for the smaller torque only, thereby reducing a load on the muscles caused by increasing the angular velocity in spite of no original output. In addition, in FIG. 9, a change of gear diameter with respect to the rotary angle of chain gear 2 is shown by the solid line and that with respect to the rotary angle of gear 3 by the chain line 25.

The chain gears 2 and 3 in FIG. 7 each have a ratio of 1.06 to 1.20:1 between the major axes $X_1$ and $X_2$ and the minor axes $Y_1$ and $Y_2$ respectively. In this case, since the service number of rotations of chain gears 2 and 3 are different as 70 to 90 rpm normally in the larger diameter gear 3 and 60 to 80 rpm in the smaller diameter gear 2 and the torque of each crank arm becomes about zero in the vicinity of the upper and lower dead points, the ratio of the maximum torque to the minimum torque in the same power is smaller at the larger diameter gear 3 used in the larger number of rotations than the smaller diameter gear 2 in the smaller number of rotations, whereby it is preferable to make the ratio $X_1:Y_1$ of the major axis to minor axis in the gear 2 larger than that $X_2:Y_2$ in the gear 3, concretely $X_1:Y_1$ is 1.09:1 and $X_2:Y_2$ is 1.06:1.

Thus, the muscular strength of cyclist can be efficiently used to reduce his physical load.

Now, in a case of using single chain gear having teeth more than those in the first chain gear 2, the major axis of the same is preferable to be shifted rearwardly of the crank arms 12 and 13 in the forward rotation direction thereof.

In other words, the single chain gear larger in tooth-number often is used for driving the bicycle at high speed on a downward slope or a flat road, in which the motion of crank arms 12 and 13 requires fast speed and larger power. This chain gear preferably has the minimum gear diameter portion and maximum gear diameter portion shifted rearwardly of crank arms 12 and 13 in the driven-rotation direction thereof with respect to the positions where the leg torque becomes maximum and minimum, in which the shifting angle, like with the first chain gear 2, is set to be 15°±5°.

Accordingly, when this idea is applied to the second chain gear 3 in FIG. 7, the shifting angle is 25° to 35°.

This invention is applicable to a conventional type bicycle, a mini-cycle type bicycle and others. Alternatively, in the case of using two elliptic chain gears 2 and 3 as shown in FIG. 7, the gears not-round like an ellipse may be used. Also, three or more chain gears may be constructed similarly to the two gears 2 and 3.

As seen from the above, the gear crank apparatus of the invention has at least one chain gear not-round and shaped like an ellipse and is mounted to the crank so as to increase the angular velocity in the region for the larger torque and decrease the angular velocity in the region for the small torque only, thereby improving the power during the pedalling and matching the pedalling with the speed pattern produced by the motion of a cyclist's leg, thus reducing the load applied on the cyclist and enabling performance of a smooth pedalling.

Furthermore, in a case of using a plurality of first and second chain gears, the maximum gear diameter portion at the first chain gear smaller in tooth-number is shifted forwardly in the rotation direction of crank arms with respect to the maximum gear diameter portion at the second chain gear larger in tooth-number, whereby each gear, even in different condition, can be used efficiently with its characteristic.

Although several embodiments have been described, they are merely exemplary of the invention and not to be constructed as limiting, the invention being defined solely by the appended claims.

What is claimed is:

1. A gear crank apparatus for a bicycle comprising a crank shaft, a pair of crank arms, and at least one chain gear, said chain gear being provided with a gear body and a number of teeth provided circumferentially at the outer periphery of said gear body and having a not-round ellipse-like shape so that pitch diameters of a number of said teeth are different circumferentially of said gear body, said crank arms being operated in rotation to rotate said chain gear, so that the gear diameter is adapted to change at a rate to correspond to a change of torque produced by a cyclist's leg and transmitted to said driving chain during rotary operation of said crank arms, said chain gear being arranged with respect to said crank arms so that said crank arms are disposed rearwardly relative to a drive-rotation direction with respect to a maximum gear diameter portion of said chain gear, such that when the torque produced by the cyclist's leg is maximum during the rotatable operation of said crank arms, the gear diameter of said chain gear becomes substantially minimum and when the torque produced by the cyclist's leg is minimum, the gear diameter of said chain gear becomes substantially maximum.

2. A gear crank apparatus for a bicycle according to claim 1, wherein the minimum gear diameter portion at said chain gear is shifted one-sidedly in the driven-rotation direction of said crank arms with respect to a position where the torque produced by the cyclist's leg becomes a maximum.

3. A gear crank apparatus for a bicycle according to claim 2, wherein the minimum gear diameter portion at said chain gear is shifted forwardly in the driven-rotation direction of said crank arms with respect to a position where the torque produced by the cyclist's leg becomes a maximum.

4. A gear crank apparatus for a bicycle comprising a crank shaft, a pair of crank arms, and first and second chain gears different in diameter, each of said chain gears being provided with a gear body and a large number of teeth provided circumferentially at the outer periphery of said body, and having a not-round ellipse-like shape, the pitch diameters of the large number of teeth of said chain gears being different circumferentially of each respective gear body, said crank arms rotationally operating to rotate each of said chain gears so that the gear diameter of each of said gears changes when a torque produced by a cyclist's leg is transmitted by one of said chain gears, each of said chain gears being mounted to a crank so that when the torque produced by the cyclist's leg is maximum, the gear diameter of said one chain gear becomes substantially minimum and when the torque produced by a cyclist's leg is minimum, said gear diameter of said one gear becomes substantially maximum, the maximum gear diameter portion of the first chain gear being smaller in tooth-number and being shifted forwardly in the forward rotation direction of said crank arms with respect to the maximum gear diameter portion of said second chain gear, said second chain gear having a larger tooth-number.

5. A gear crank apparatus for a bicycle according to claim 4, wherein the pitch diameter of said first and second chain gears are changed at a rate of change corresponding to that of the torque produced by a cyclist's leg during the rotary operation of said crank arms.

6. A gear crank apparatus for a bicycle according to claim 4, wherein the maximum gear diameter portion at the first chain gear is shifted forwardly in the driven-rotation direction of said crank arms with respect to the position where the torque produced by the cyclist's leg becomes minimum.

7. A gear crank apparatus for a bicycle according to claim 4, wherein a ratio of a length of said maximum gear diameter portion to a length of said minimum gear diameter portion at the first chain gear is larger than a ratio of a length of said maximum gear diameter portion to a length of said minimum gear diameter portion at the second chain gear.

* * * * *

REEXAMINATION CERTIFICATE (1530th)
United States Patent [19]
Nagano

[11] B1 4,522,610
[45] Certificate Issued  Aug. 13, 1991

[54] GEAR CRANK APPARATUS FOR A BICYCLE

[75] Inventor: Masashi Nagano, Izumi, Japan

[73] Assignee: Shimano Industrial Company Limited, Japan

Reexamination Request:
No. 90/002,105, Aug. 10, 1990

Reexamination Certificate for:
Patent No.: 4,522,610
Issued: Jun. 11, 1985
Appl. No.: 497,051
Filed: May 23, 1983

[30] Foreign Application Priority Data

Jun. 1, 1982 [JP] Japan ............... 57-94396
Jul. 2, 1982 [JP] Japan ............... 57-115837
Oct. 9, 1982 [JP] Japan ............... 57-177828

[51] Int. Cl.$^5$ ............... F16H 55/30
[52] U.S. Cl. ............... 474/141
[58] Field of Search ............... 474/78, 141; 280/236, 280/261

[56] References Cited
U.S. PATENT DOCUMENTS

| | | |
|---|---|---|
| 515,449 | 2/1894 | Scovell . |
| 599,689 | 3/1898 | Crandall . |
| 2,693,119 | 1/1953 | Payberg et al. . |
| 3,004,440 | 10/1958 | Pernik . |
| 3,047,310 | 11/1959 | De Baun . |
| 3,259,398 | 12/1964 | Hattan . |
| 3,834,733 | 12/1972 | Harris . |
| 3,906,807 | 11/1973 | Trammell, Jr. . |
| 4,029,334 | 9/1975 | Trammell, Jr. . |
| 4,133,550 | 2/1978 | Brown . |

FOREIGN PATENT DOCUMENTS

| | | |
|---|---|---|
| 389663 | 8/1952 | Belgium . |
| 2219530 | 10/1973 | Fed. Rep. of Germany . |
| 361511 | 3/1907 | France . |
| 821216 | 11/1937 | France . |
| 880851 | 4/1943 | France . |
| 909106 | 4/1946 | France . |
| 974415 | 2/1951 | France . |
| 1027471 | 5/1953 | France . |
| 2265018 | 10/1975 | France . |
| 472454 | 6/1952 | Italy . |
| 480191 | 4/1953 | Italy . |
| 24-4568 | 11/1949 | Japan . |
| 48-60248 | 7/1973 | Japan . |
| 4410899 | 7/1973 | Japan . |
| 49-2046 | 1/1974 | Japan . |
| 49-39148 | 4/1974 | Japan . |
| 282923 | 8/1952 | Switzerland . |
| 24525 | of 1896 | United Kingdom . |
| 379 | of 1898 | United Kingdom . |

OTHER PUBLICATIONS

Dailey, "49$^{er}$ Engineer," Elliptical Sprockets, vol. IX, No. 2, (Dec. 1975), pp. 2-5.

*Primary Examiner*—Thuy M. Bui

[57] ABSTRACT

A gear crank apparatus for a bicycle, comprising a crank shaft, a pair of crank arms, and at least one chain gear. The chain gear has an ellipse-like shape and peripheral teeth located on different pitch diameters, the chain gear being arranged with respect to the crank arms and being coupled therewith, so that when torque produced by a cyclist's leg during pedalling is maximum, the gear diameter for transmitting the torque from the chain gear to a driving chain becomes substantially minimum and when the torque is a minimum, the gear diameter becomes substantially a maximum.

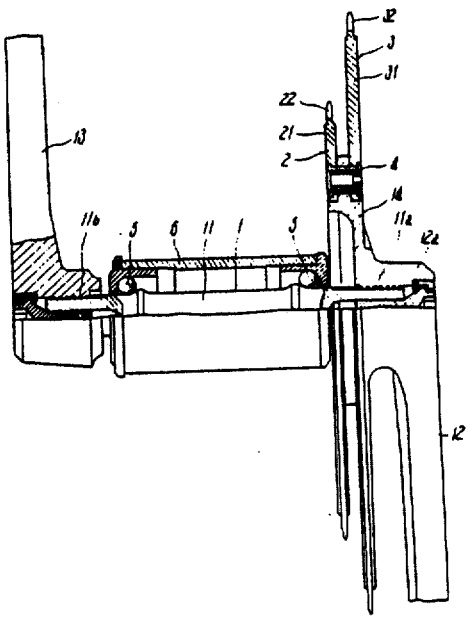

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 4–7 is confirmed.

Claims 1-3 are determined to be patentable as amended.

1. A gear crank apparatus for a bicycle comprising a crank shaft, a pair of crank arms, and at least [one chain gear,] *two chain gears different in diameter, each of* said chain [gear] *gears* being provided with a gear body and a number of teeth provided circumferentially at the outer periphery of said gear body and having a not-round ellipse-like shape so that pitch diameters of a number of said teeth are different circumferentially of [said] *each respective* gear body, said crank arms being operated in rotation to rotate said chain [gear] *gears*, so that the gear diameter *of each of said chain gears* is adapted to change at a rate to correspond to a change of torque produced by a cyclist's leg and transmitted to said driving chain during rotary operation of said crank arms, *a first one of* said chain [gear] *gears* being arranged with respect to said crank arms so that said crank arms are disposed rearwardly relative to a drive-rotation direction with respect to a maximum gear diameter portion of said *first* chain gear, such that when the torque produced by the cyclist's leg is maximum during the rotatable operation of said crank arms, the gear diameter of said *first* chain gear becomes substantially minimum and when the torque produced by the cyclist's leg is minimum, the gear diameter of said *first* chain gear becomes substantially maximum, *the maximum gear diameter portion of one of said at least two chain gears being shifted forwardly in the forward rotation direction of said crank arms with respect to the maximum gear diameter portion of another of said at least two chain gears.*

2. A gear crank apparatus for a bicycle according to claim 1, wherein the minimum gear diameter portion at said *first* chain gear is shifted one-sidedly in the driven-rotation direction of said crank arms with respect to a position where the torque produced by the cyclist's leg becomes a maximum.

3. A gear crank apparatus for a bicycle according to claim 2, wherein the minimum gear diameter portion at said *first* chain gear is shifted forwardly in the driven-rotation direction of said crank arms with respect to a position where the torque produced by the cyclist's leg becomes a maximum.

* * * * *